United States Patent
Shen et al.

(10) Patent No.: US 12,367,995 B2
(45) Date of Patent: Jul. 22, 2025

(54) METHODS FOR PREPARING MAGNETOSTRICTIVE POWDER AND MAGNETOSTRICTIVE COATING

(71) Applicant: China Special Equipment Inspection and Research Institute, Beijing (CN)

(72) Inventors: Gongtian Shen, Beijing (CN); Qingli Qi, Beijing (CN); Yang Zheng, Beijing (CN); Yilin Yuan, Beijing (CN); Qingchuan Pan, Beijing (CN)

(73) Assignee: China Special Equipment Inspection and Research Institute, Beijing (CN)

( * ) Notice: Subject to any disclaimer, the term of this patent is extended or adjusted under 35 U.S.C. 154(b) by 0 days.

(21) Appl. No.: 18/097,110

(22) Filed: Jan. 13, 2023

(65) Prior Publication Data
US 2023/0274866 A1 Aug. 31, 2023

(30) Foreign Application Priority Data
Feb. 28, 2022 (CN) .......................... 202210188476.7

(51) Int. Cl.
H01F 1/153 (2006.01)
B05D 1/02 (2006.01)
G01N 29/24 (2006.01)

(52) U.S. Cl.
CPC ............ *H01F 1/1535* (2013.01); *B05D 1/02* (2013.01); *G01N 29/2412* (2013.01); *G01N 2291/0231* (2013.01)

(58) Field of Classification Search
CPC ......... H01F 1/1535; H01F 1/147; B05D 1/02; B22F 1/05; B22F 9/082; C22C 33/02; C23C 24/045; C23C 4/12; C23C 24/04
See application file for complete search history.

(56) References Cited

U.S. PATENT DOCUMENTS 2,997,245 A * 8/1961 Nilsson ................ B01J 13/0086
264/9
3,275,787 A * 9/1966 Newberry ................ B22F 9/08
219/121.33
(Continued)

FOREIGN PATENT DOCUMENTS

CN 104439258 A 3/2015
CN 104475743 A 4/2015
(Continued)

OTHER PUBLICATIONS

Gao Xuexu, et.al. [CN105252011A] (Machine translation form Espacenet) (Year: 2016).*
First Office Action and Search Report issued on Aug. 30, 2023 for counterpart Chinese Patent Application No. 202210188476.7, along with machine EN translation downloaded from EPO, 19 pages.
(Continued)

*Primary Examiner* — Sally A Merkling
*Assistant Examiner* — Nazmun Nahar Shams
(74) *Attorney, Agent, or Firm* — Michael Fedrick; LOZA & LOZA, LLP

(57) ABSTRACT

The present disclosure provides methods for preparing magnetostrictive powder and magnetostrictive coating, and relates to the field of magnetic functional materials and preparation thereof. The method for preparing magnetostrictive powder includes putting metals for preparing magnetostrictive powder into a vacuum melting furnace to be melted into a solution; and atomizing the solution into fine droplets by ultrasonic atomization, so that the fine droplets are cooled and solidified into magnetostrictive powder. In the method for preparing magnetostrictive powder according to the embodiments of the present disclosure, the sizes of the prepared powder are relatively uniform, the powder yield exceeds 90%, the ultrasonic atomization energy consumption is low, and energy is saved by about ¼ compared with conventional atomization.

3 Claims, 2 Drawing Sheets

(56) References Cited

U.S. PATENT DOCUMENTS

| | | | | |
|---|---|---|---|---|
| 4,485,834 A | * | 12/1984 | Grant | C03B 19/01 |
| | | | | 425/7 |
| 6,444,009 B1 | * | 9/2002 | Liu | B22F 9/082 |
| | | | | 75/332 |
| 2012/0128970 A1 | * | 5/2012 | Motoe | C23C 4/06 |
| | | | | 252/62.51 R |

FOREIGN PATENT DOCUMENTS

| | | | |
|---|---|---|---|
| CN | 105252011 A | | 1/2016 |
| CN | 111850387 A | | 10/2020 |
| JP | 2007162064 A | | 6/2007 |

OTHER PUBLICATIONS

Second Office Action issued for counterpart Chinese Patent Application No. 202210188476.7, mailed on Jan. 26, 2024, along with machine EN translation downloaded from EPO, 15 pages.

Decision of Rejection and search report issued on Apr. 8, 2024 for counterpart Chinese Patent Application No. 202210188476.7, along with EN translation, downloaded from EPO, 21 pages.

Qi Qingli, et al., The microstructure and properties study of Fe-Ga magnetostrictive powder and coating, Functional Materials, Article No. 1001-9731, pp. 01123-01127 (2022), 5 pages.

Wang Haijun, The Hot Spray Engineer's Guide, Thermal Spray Technology Series, National Defense Industry Press, China Version Library CIP Data Verification, (2010) No. 151075, title page and p. 222 (7 pages).

\* cited by examiner

METHODS FOR PREPARING MAGNETOSTRICTIVE POWDER AND MAGNETOSTRICTIVE COATING

CROSS-REFERENCE TO RELATED APPLICATIONS

This application claims priority to Chinese Patent Application No. 202210188476.7, filed on Feb. 28, 2022, which is hereby incorporated by reference in its entirety.

TECHNICAL FIELD

The present disclosure relates to the field of magnetic functional materials and preparation thereof, and particularly to methods for preparing magnetostrictive powder and a magnetostrictive coating.

BACKGROUND

In the fields of iron and steel, petroleum, chemical industry, transportation and so on, metal members such as pipes and plates are widely used, and will be subject to defects such as corrosion, fracture, and perforation after long-term use. These defects, if not dealt with in time, may cause loss of life and property. Therefore, in order to avoid accidents, it is particularly important to conduct regular and effective online monitoring of the industrial equipment. The ultrasonic guided wave, which features long detection distance, high efficiency, and comprehensive detection, is suitable for regular detection and online monitoring of inaccessible pipelines and pressure vessels with high-temperature and high-pressure. At present, there are three types of conventional sensors, i.e., an electromagnetic ultrasonic sensor, a piezoelectric ultrasonic sensor and a magnetostrictive sensor. The electromagnetic ultrasonic sensor has defects such as low energy conversion efficiency and insufficient signal-to-noise ratio. The piezoelectric sensor requires a coupling agent between a probe and an object to be detected, and a surface of the object to be detected usually needs a pretreatment, so the piezoelectric ultrasonic detection technology is difficult to meet the requirements.

The magnetostrictive sensor, with its unique technical advantages of non-contact, no need of coupling agent, long-distance and quick detection, has a large detection range, realizes non-contact and is suitable for working in harsh environments such as high-temperature and corrosion. Although its energy conversion efficiency is lower than that of the piezoelectric ultrasonic sensor, its high detection accuracy can still meet most of the detection requirements.

At present, the magnetostrictive powder is prepared by high-pressure atomization (gas atomization) and water atomization, and then coated on a surface of a piece to be detected by thermal spraying or cold spraying to be used as a magnetostrictive sensor probe for a magnetostrictive guided wave detection, which is adaptive to the complex contour structure of the piece. However, the preparation of the magnetostrictive powder by high-pressure atomization (gas atomization) and water atomization has the disadvantages that the particle sizes of the prepared powder are diffused, the utilization rate is low, and the energy consumption of the whole preparation process is high.

SUMMARY

Aiming at the problems in the prior art, the embodiments of the present disclosure provide methods for preparing magnetostrictive powder and a magnetostrictive coating, which can at least partially solve the problems in the prior art.

In an aspect, the present disclosure provides a method for preparing magnetostrictive powder, including:
putting metals for preparing magnetostrictive powder into a vacuum melting furnace to be melted into a solution; and
atomizing the solution into fine droplets by ultrasonic atomization, so that the fine droplets are cooled and solidified into magnetostrictive powder.

Optionally, putting metals for preparing magnetostrictive powder into a vacuum melting furnace to be melted into a solution includes: putting iron and one or more selected from the group of gallium, cobalt, aluminum, and nickel into a vacuum smelting furnace in a predetermined ratio to be melted into an alloy solution.

Optionally, the method further includes: keeping a temperature of the alloy solution at 300° C. to 400° C. above a melting point of the alloy solution for 10 to 30 minutes.

Optionally, the temperature of the alloy solution is kept at 350° C. above the melting point of the alloy solution for 10 to 30 minutes.

Optionally, atomizing the solution into fine droplets by ultrasonic atomization includes:
impacting a liquid metal flow formed by the solution with an airflow with a frequency of 85 kHz to 95 kHz and a velocity of 2.2 Mach to 2.4 Mach by ultrasonic atomization.

Optionally, particle sizes of the magnetostrictive powder are 15 μm to 22 μm.

Optionally, an average particle size of the magnetostrictive powder is 20 μm.

In another aspect, the present disclosure provides a method for preparing a magnetostrictive coating, including:
depositing the magnetostrictive powder prepared by the method for preparing the magnetostrictive powder according to any of the above embodiments on a surface of a piece (an object or portion of an object or material) to be detected by surface coating, to form a magnetostrictive coating attached to the surface of the piece.

Optionally, the magnetostrictive powder is sprayed on the surface of the piece to be detected by thermal spraying or cold spraying.

In still another aspect, the present disclosure provides a magnetostrictive guided wave detection device, wherein a probe of the magnetostrictive guided wave detection device is a magnetostrictive coating prepared by the method for preparing the magnetostrictive coating according to any of the above embodiments.

Compared with the conventional three-stage process of high-pressure atomization (gas atomization) and water atomization, the method for preparing magnetostrictive powder according to the present disclosure has the advantages that the ultrasonic atomized molten metals are impacted and sheared into metal droplets by a plurality of fine jets in one stage, the particles sizes of the obtained powder are relatively uniform, the powder yield exceeds 90%, and the cooling velocity estimated by dendritic arm spacing exceeds 100° C./s. The energy consumption of the ultrasonic atomization is low, and energy is saved by about ¼ compared with the conventional atomization.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

DETAILED DESCRIPTION

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure. It should be noted that the embodiments in the present disclosure and the features in the embodiments can be arbitrarily combined with each other without conflict.

Figure 1:
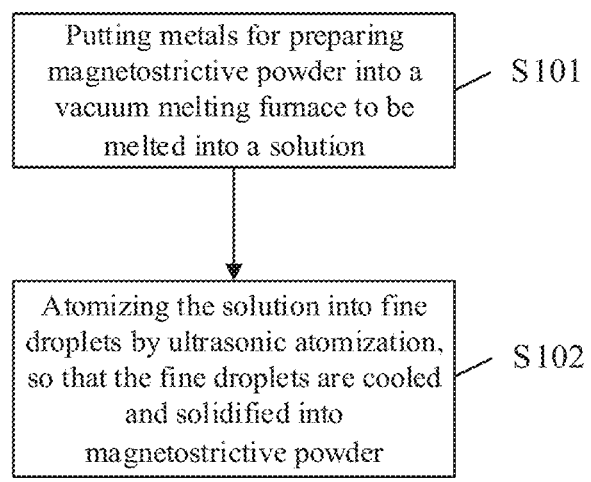
FIG. 1 is a flowchart of a method for preparing magnetostrictive powder according to an embodiment of the present disclosure.

FIG. 1 is a flowchart of a method for preparing magnetostrictive powder according to an embodiment of the present disclosure. As illustrated in FIG. 1, a method for preparing magnetostrictive powder according to an embodiment of the present disclosure includes:

S101: putting metals for preparing magnetostrictive powder into a vacuum melting furnace to be melted into a solution;

In this step, the metals for preparing the magnetostrictive powder may include iron, gallium, cobalt, aluminum, nickel, etc., and the ingots or alloy ingots of the above metals may be put into the vacuum melting furnace to be melted into a solution.

S102: atomizing the solution into fine droplets by ultrasonic atomization, so that the fine droplets are cooled and solidified into magnetostrictive powder.

In this step, an ultrasonic generator in an atomization furnace outputs high-frequency electric energy, so that a crystal transducer at the bottom of a cavity of the atomization furnace generates ultrasonic sound energy, and then the solution is slowly poured into the atomization furnace. The sound energy vibrates a sound-transparent film at the bottom of the atomization furnace to act on the liquid in the atomization furnace, which destroys a surface tension and inertia of the molten metals, so that the molten metals are broken into fine droplets and cooled to form powder with a certain particle size range.

Compared with the conventional three-stage process of high-pressure atomization (gas atomization) and water atomization, the method for preparing magnetostrictive powder according to the present disclosure has the advantages that the ultrasonic atomized molten metals are impacted and sheared into metal droplets by a plurality of fine jets in one stage, the particles sizes of the obtained powder are relatively uniform, the powder yield exceeds 90%, and the cooling velocity estimated by dendritic arm spacing exceeds 100° C./s. The energy consumption of the ultrasonic atomization is low, and energy is saved by about ¼ compared with the conventional atomization.

Optionally, putting metals for preparing magnetostrictive powder into a vacuum melting furnace to be melted into a solution includes: putting iron and one or more selected from the group of gallium, cobalt, aluminum, and nickel into a vacuum smelting furnace in a predetermined ratio to be melted into an alloy solution. In this embodiment, the metals put into the vacuum smelting furnace and a proportion of each metal may be predetermined according to the metals and a proportion of each metal in the magnetostrictive powder to be prepared.

Optionally, the method further includes: keeping a temperature of the alloy solution at 300° C. to 400° C. above a melting point of the alloy solution for 10 to 30 minutes. For example, the temperature of the alloy solution is kept at 350° C. above the melting point of the alloy solution for 10 to 30 minutes. The short-term heat preservation of the alloy solution is to make the molten metals fully mixed, with uniform compositions and without segregation.

Optionally, atomizing the solution into fine droplets by ultrasonic atomization includes: impacting a liquid metal flow formed by the solution with an airflow with a frequency of 80 kHz to 100 kHz and a velocity of 2 Mach to 2.5 Mach by ultrasonic atomization, so that the solution is atomized into fine droplets.

In this embodiment, the magnetostrictive powder prepared at the above velocity and frequency has particle sizes of 15 μm to 22 μm and an average particle size of less than or equal to 20 μm. The particle sizes of the powder are relatively uniform, so all the powder can be used for spraying, and the utilization rate of the powder is high.

It is another aspect of the present disclosure to provide a method for preparing a magnetostrictive coating, including: depositing the magnetostrictive powder, which is prepared by the method for preparing the magnetostrictive powder according to any of the above embodiments, on a surface of a piece to be detected by surface coating to form a magnetostrictive coating attached thereto.

In this embodiment, the magnetostrictive metal powder is prepared by ultrasonic atomization and then deposited on the surface of the piece to be detected by surface coating, which improves the bonding strength between the coating and the piece to be detected, improves the detection sensitivity of the magnetostrictive coating under an external magnetic field, eliminates the influence of human factors compared with the magnetostrictive strip guided wave detection, does not need a coupling agent, and is resistant to the high temperature, thus being applicable for long-term online monitoring.

Optionally, the magnetostrictive powder may be sprayed on the surface of the piece to be detected by, but not limited to, thermal spraying or cold spraying.

It is still another aspect of the present disclosure to provide a magnetostrictive guided wave detection device, a probe of which is a magnetostrictive coating prepared by the method for preparing a magnetostrictive coating according to any of the above embodiments.

In this embodiment, the magnetostrictive guided wave detection device may include a permanent magnet, a magnetostrictive coating, an excitation coil, a receiving coil, and a guided wave instrument. The permanent magnet is configured to provide a bias magnetic field, and the excitation coil is configured to transmit an excitation signal, which excites the piece to be detected to generate an ultrasonic guided wave signal. The receiving coil is configured to receive a signal reflection echo of the ultrasonic guided wave, which is converted into a voltage signal by a signal processor of the guided wave instrument. The magnetostrictive coating is configured to enhance the energy conversion efficiency, so that the guided wave echo signal is strengthened. Meanwhile, the magnetostrictive coating is mainly metallurgically bonded with the piece to be detected, so that the ultrasonic transmission efficiency is improved.

Specifically, a signal generator of the guided wave instrument generates an excitation signal, and the excitation signal is transmitted by the excitation coil and is enhanced by the sensitive element (i.e., the magnetostrictive coating) to generate an ultrasonic guided wave on the piece to be detected. The guided wave signal is coupled to the surface of the piece to be detected and propagated along an axial direction, wherein the piece to be detected includes metal and non-metal materials. During propagation of the guided wave, a defect reflects an echo signal, which is converted into a voltage signal by the receiving coil and the signal processor. The signal processor of the guided wave instrument analyzes the signal to obtain an accurate position of the defect on the piece to be detected.

In the magnetostrictive guided wave sensor according to the embodiment of the present disclosure, by replacing the conventional magnetostrictive strip with the magnetostrictive coating, the guided wave detection sensitivity is obviously improved, and the detection of non-ferrous materials and ferromagnetic materials can be realized, and adhesives (epoxy resin glue, etc.) are not needed. Therefore, the magnetostrictive guided wave sensor is suitable for detecting defects in high and low temperatures or harsh environments.

The magnetostrictive guided wave detection device according to the present disclosure has the following advantages.

1. The magnetostrictive coating is used as a sensitive element, and the coating is directly metallurgically bonded with the piece to be detected, with a good bonding strength, which simplifies the detection device, enhances the sound transmission efficiency between the sound wave and the piece to be detected, and improves the energy conversion efficiency of the guided wave, thus increasing the detection sensitivity.

2. No coupling agent is needed, and the magnetostrictive guided wave detection device is suitable for any complex contour structure and less influenced by external factors, thus reducing the online monitoring cost.

The detection sensitivity of the magnetostrictive guided wave detection device according to the present disclosure is verified through the following specific embodiments.

Embodiment 1: a magnetostrictive coating attached to a surface of a steel plate is prepared by a method for preparing a magnetostrictive coating according to the present disclosure, and on this basis, a magnetostrictive guided wave detection device is developed to conduct a guided wave detection on the surface of steel plate.

Figure 2:
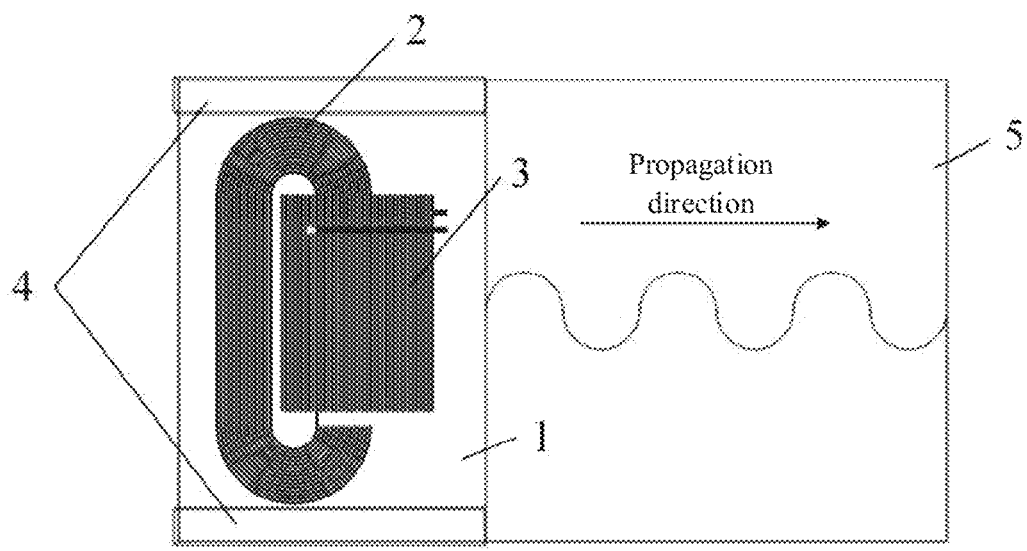
FIG. 2 is a schematic diagram of a part of structure of a magnetostrictive guided wave detection device according to an embodiment of the present disclosure.
Figure 3:
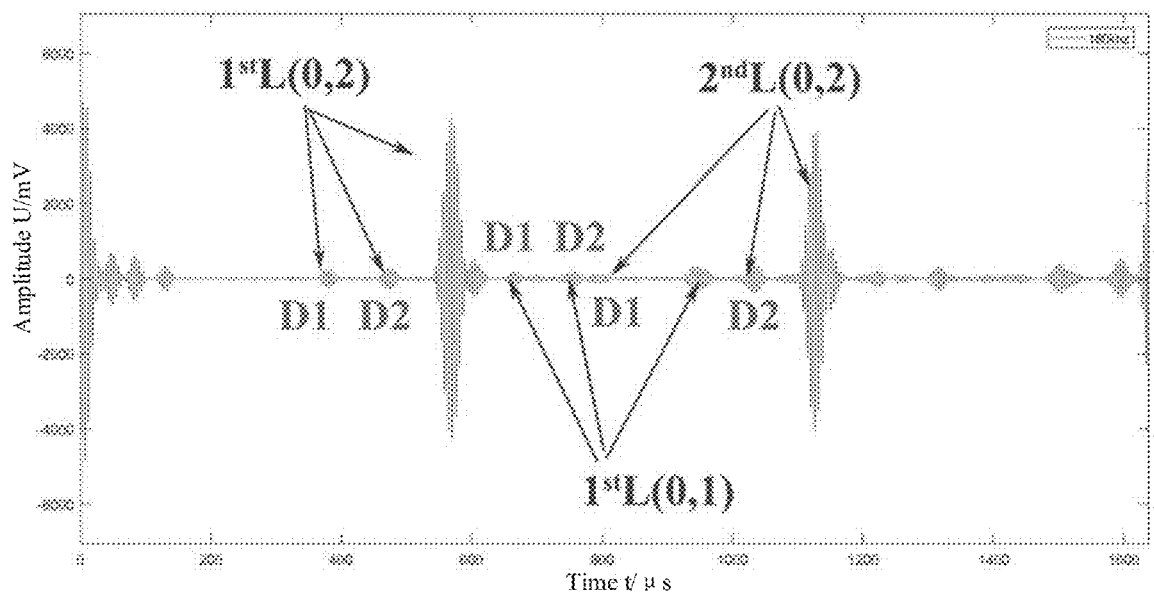
FIG. 3 is a schematic diagram of a detection result of surface waves of a magnetostrictive coating obtained according to an embodiment of the present disclosure.

(1) Fe—Ni magnetostrictive powder is prepared, and powder with particle sizes of 15 μm to 22 μm is screened out; a surface of a Q345 steel plate with a length of 1.5 m is sandblasted, and two defects are artificially made on the surface of a Q345 steel plate;

(2) The magnetostrictive powder is sprayed on one end of the Q345 steel plate by thermal spraying to obtain a magnetostrictive coating;

(3) As illustrated in FIG. 2, an excitation coil 3 and a receiving coil 2 are wound around the magnetostrictive coating 1; the excitation coil 3 generates an alternating magnetic field, and a bias magnetic field is provided by a cylindrical permanent magnet 4. Under combined action of the alternating magnetic field and the bias magnetic field, the magnetostrictive coating 1 generates a strictive strain, which causes a particle vibration, and the vibration is transmitted in the form of waves to form ultrasonic guided waves, so as to realize the surface wave detection of the steel plate 5;

(4) A signal is reflected back when the surface wave encounters a defect or an end face during propagation; the receiving coil receives the signal and converts a change of magnetization intensity into a voltage signal; and the voltage signal is processed and analyzed to obtain a detection result of the surface wave of the magnetostrictive coating, as illustrated in FIG. 3. It can be seen that when the guided wave generated by the magnetostrictive guided wave detection device propagates along the steel plate, signals are reflected back at the defect and the end face respectively, and a position is determined according to the wave velocity and time and is consistent with a defect position, thus indicating that the magnetostrictive guided wave detection device has a good effect in the guided wave detection.

Embodiment 2: a magnetostrictive coating attached to an end of an aluminum conductor steel reinforced (ACSR) is prepared by a method for preparing a magnetostrictive coating according to the present disclosure, and on this basis, a magnetostrictive guided wave detection device is developed to conduct a longitudinal guided wave detection on the ACSR.

Figure 4:
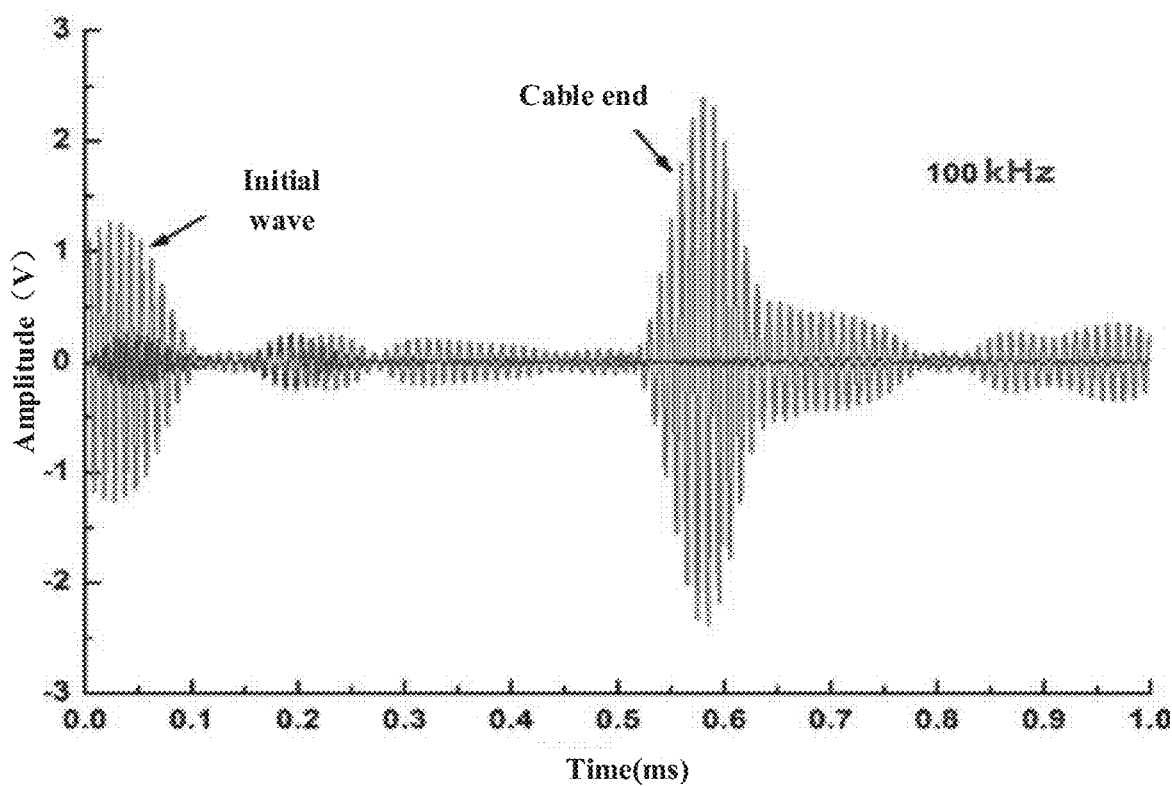
FIG. 4 is a schematic diagram of a detection result of longitudinal guided waves of a magnetostrictive coating obtained according to an embodiment of the present disclosure.

(1) Fe—Al magnetostrictive powder is prepared, and powder with particle sizes of 15 μm to 20 μm is screened out; a ACSR with a length of 2 m is sandblasted, and two defects are artificially made on the ACSR;

(2) the magnetostrictive powder is sprayed on one end of the ACSR pipe by low-pressure plasma thermal spraying to obtain a magnetostrictive coating;

(3) an excitation coil and a receiving coil are wound around the magnetostrictive coating; the excitation coil generates an alternating magnetic field, and a bias magnetic field is provided by two permanent magnets. Under combined action of the alternating magnetic field and the bias magnetic field, the magnetostrictive coating generates a strictive strain, which causes a particle vibration, and the vibration is transmitted in the form of waves to form ultrasonic guided waves;

(4) a signal is reflected back when the longitudinal wave encounters an end face during propagation; the receiving coil receives the signal and converts a change of magnetization intensity into a voltage signal; and the voltage signal is processed and analyzed to obtain a detection result of the longitudinal guided wave of the magnetostrictive coating, as illustrated in FIG. 4. It can be seen that when a guided wave generated by the magnetostrictive guided wave sensor propagates along the ACSR, signals are reflected back at the defect and the end face respectively, and a position is determined according to the wave velocity and time and is consistent with a defect position, thus indicating that the coating guided wave detection device has a good effect in the guided wave detection.

In the present disclosure, descriptions referring to the terms such as 'an embodiment', 'a specific embodiment', 'some embodiments', 'for example', 'an example', 'a specific example' or 'some examples' mean that the specific features, structures, materials, or characteristics described in connection with the embodiment(s) or example(s), are included in at least one embodiment or example of the present disclosure. In the present disclosure, the schematic expressions of the above terms do not necessarily refer to a same embodiment or example. Further, the specific features, structures, materials, or characteristics described may be combined in any one or more embodiments or examples in a suitable manner.

The purpose, technical features and technical effects of the present disclosure have been further described above by means of some embodiments. It should be understood that the embodiments are meant to facilitate understanding of the principles of the present disclosure, rather than limit the scope of the present disclosure. Any modifications, alternations, improvements, etc., made by those skilled in the art without departing from the concepts and principles of this disclosure shall fall within the scope of the present disclosure.

The invention claimed is:

1. A method for preparing magnetostrictive powder, comprising:
    putting metals for preparing the magnetostrictive powder into a vacuum melting furnace to be melted into a solution, wherein the putting metals for preparing magnetostrictive powder into a vacuum melting furnace to be melted into a solution comprises putting iron and one or more metals selected from the group consisting of gallium, cobalt, aluminum, and nickel into a vacuum smelting furnace to be melted into an alloy solution;
    keeping a temperature of the alloy solution at 350° C. above a melting point of the alloy solution for 10 to 30 minutes; and
    atomizing the solution into fine droplets by ultrasonic atomization, so that the fine droplets are cooled and solidified into magnetostrictive powder, wherein the atomizing the solution into fine droplets by ultrasonic atomization comprises:
        outputting high-frequency electric energy with an ultrasonic generator in an atomization furnace, so that a crystal transducer at the bottom of a cavity of the atomization furnace generates ultrasonic sound energy;
        pouring the solution into the atomization furnace, wherein the sound energy vibrates a sound-transparent film at the bottom of the atomization furnace to act on the liquid in the atomization furnace, which destroys a surface tension and inertia of molten metals; and
        impacting a liquid metal flow formed by the solution with an airflow with a frequency of 85 kHz to 95 kHz and a velocity of 2.2 Mach to 2.4 Mach by ultrasonic atomization, so that the molten metals are broken and atomized into fine droplets, wherein particle sizes of the magnetostrictive powder are 15 μm to 22 μm, and an average particle size of the magnetostrictive powder is 20 μm.

2. A method for preparing a magnetostrictive coating, comprising:
    depositing the magnetostrictive powder prepared by a method for preparing the magnetostrictive powder on a surface of a piece to be detected by surface coating, to form a magnetostrictive coating attached to the surface of the piece,
    wherein the method for preparing the magnetostrictive powder comprises putting metals for preparing magnetostrictive powder into a vacuum melting furnace to be melted into a solution, wherein the putting metals for preparing magnetostrictive powder into a vacuum melting furnace to be melted into a solution comprises putting iron and one or more metals selected from the group consisting of gallium, cobalt, aluminum, and nickel into a vacuum smelting furnace to be melted into an alloy solution;
    keeping a temperature of the alloy solution at 350° C. above a melting point of the alloy solution for 10 to 30 minutes; and
    atomizing the solution into fine droplets by ultrasonic atomization, so that the fine droplets are cooled and solidified into magnetostrictive powder,
    wherein atomizing the solution into fine droplets by ultrasonic atomization comprises:
        outputting high-frequency electric energy with an ultrasonic generator in an atomization furnace, so that a crystal transducer at the bottom of a cavity of the atomization furnace generates ultrasonic sound energy;
        pouring the solution into the atomization furnace, wherein the sound energy vibrates a sound-transparent film at the bottom of the atomization furnace to act on the liquid in the atomization furnace, which destroys a surface tension and inertia of molten metals; and
        impacting a liquid metal flow formed by the solution with an airflow with a frequency of 85 kHz to 95 kHz and a velocity of 2.2 Mach to 2.4 Mach by ultrasonic atomization, so that the molten metals are broken and atomized into fine droplets, wherein particle sizes of the magnetostrictive powder are 15 μm to 22 μm, and an average particle size of the magnetostrictive powder is 20 μm.

3. The method according to claim 2, wherein the magnetostrictive powder is sprayed on the surface of the piece to be detected by thermal spraying or cold spraying.

* * * * *